United States Patent
Sivan et al.

(10) Patent No.: US 7,355,735 B1
(45) Date of Patent: Apr. 8, 2008

(54) REAL TIME FAX OVER PACKET BASED NETWORK

(76) Inventors: Yona Sivan, 5 Anilevitch Street, Safed 13400 (IL); Abraham Fisher, 15 Harofeh Street, Haifa 34367 (IL); Dror Meiri, 20 Frank Peleg, Haifa 34987 (IL); Oren Somekh, Moshav Beit Shearim, D.N. Emek-Israel 30046 (IL)

( * ) Notice: Subject to any disclaimer, the term of this patent is extended or adjusted under 35 U.S.C. 154(b) by 845 days.

(21) Appl. No.: 10/276,895

(22) PCT Filed: Oct. 17, 2000

(86) PCT No.: PCT/IL00/00657

§ 371 (c)(1),
(2), (4) Date: Nov. 20, 2002

(87) PCT Pub. No.: WO01/97503

PCT Pub. Date: Dec. 20, 2001

(30) Foreign Application Priority Data

Jun. 14, 2000 (IL) .................................... 136775
Aug. 13, 2000 (WO) ...................... PCT/IL00/00492

(51) Int. Cl.
G06F 15/00 (2006.01)
H04M 11/00 (2006.01)

(52) U.S. Cl. ............... 358/1.15; 358/434; 358/435; 358/438; 358/439; 379/100.06; 379/100.12; 379/100.17; 375/222

(58) Field of Classification Search ........... 379/100.17, 379/100.06, 100.12; 375/222; 358/1.15, 358/434–440

See application file for complete search history.

(56) References Cited

U.S. PATENT DOCUMENTS

| | | | |
|---|---|---|---|
| 5,546,388 A * | 8/1996 | Lin | 370/389 |
| RE35,740 E | 3/1998 | Piasecki et al. | |
| 5,790,641 A * | 8/1998 | Chan et al. | 379/100.17 |
| 6,044,107 A | 3/2000 | Gatherer et al. | |
| 6,434,169 B1 | 8/2002 | Verreault | |
| 6,480,585 B1 * | 11/2002 | Johnston | 379/100.17 |
| 6,522,640 B2 | 2/2003 | Liebenow | |
| 6,560,197 B1 | 5/2003 | LeVieux et al. | |
| 6,757,250 B1 | 6/2004 | Fayad et al. | |
| 6,836,538 B1 * | 12/2004 | Johnston | 379/100.17 |
| 7,075,682 B1 * | 7/2006 | Eguchi et al. | 358/434 |
| 2003/0002085 A1 * | 1/2003 | Sugawara et al. | 358/407 |

FOREIGN PATENT DOCUMENTS

WO  WO 99/38351  7/1999

(Continued)

OTHER PUBLICATIONS

ITU-T Telecommunication Standardization Sector of ITU; "Series V: Data Communication Over the Telephone Network—General;" "Procedures for Starting Sessions of Data Transmission Over the Public Switched Telephone Network;" Feb. 1998; International Telecommunication Union (ITU) V.8.

(Continued)

Primary Examiner—Douglas Q. Tran
Assistant Examiner—Chan S. Park (57) ABSTRACT

A method of establishing a fax connection on a link which is a portion of a composite connection. The method includes transmitting at least some signals of a negotiation procedure on the link and initiating a retrain on the connection, without identifying a problem on the connection of the link, the retrain being initiated after transmitting the at least some signals of the negotiation procedure but before transmitting data on the data channel of the link due to the negotiation procedure.

39 Claims, 4 Drawing Sheets

FOREIGN PATENT DOCUMENTS

| | | |
|---|---|---|
| WO | WO 99/38352 | 7/1999 |
| WO | WO 99/39530 | 8/1999 |
| WO | WO 99/40685 | 8/1999 |
| WO | WO 00/11843 | 3/2000 |
| WO | WO 01/01654 | 1/2001 |
| WO | WO 01/35228 | 5/2001 |
| WO | WO 01/60008 | 8/2001 |
| WO | WO 01/91506 | 11/2001 |

OTHER PUBLICATIONS

ITU-T Telecommunication Standardization Sector of ITU; "Data Communication Over the Telephone Network;" "1200 Bits per Second Duplex Modem Standardized for Use in the General Switched Telephone Network and on Point-to-Point 2-Wire Leased Telephone-Type Circuits;" 1993; International Telecommunication Union; ITU-T Recommendation V.22.

ITU-T Telecommunication Standardization Sector of ITU; "Data Communication Over the Telephone Network;" "A Family of 2-Wire, Duplex Modems Operating at Data Signalling Rates of up to 9600 bit/s for Use on the General Switched Telephone Network and on Leased Telephone-Type Circuits;" Mar. 1993; International Telecommunication Union; ITU-T Recommendation V.32.

ITU-T Telecommunication Standardization Sector of ITU; "Series V: Data Communication Over the Telephone Network—Interfaces and Voiceband Modems;" "A Modem Operating at Data Signalling Rates of up to 33 600 Bits/s for Use on the General Switched Telephone Network and on Leased Point-to-Point 2-Wire Telephone-Type Circuits;" Oct. 9, 1996; International Telecommunication Union; ITU-T Recommendation V.34, XP002082229.

ITU-T Telecommunication Standardization Sector of ITU; "Series T: Terminals for Telematic Services;" "Procedures of real-time Group 3 facsimile communication over IP networks;" Jun. 18, 1998; International Telecommunication Union; ITU-T Recommendation T.38, XP002163782.

ITU-T Telecommunication Standardization Sector of ITU; "Series V: Data Communication Over the Telephone Network—Simultaneous Transmission of Data and Other Signals;" "A Digital Modem and Analogue Modem Pair for Use on the Public Switched Telephone Network (PSTN) at Data Signalling Rates of up to 56,000 Bits/s Downstream and up to 33,600 Bits/s Upstream;" Sep. 1998; International Telecommunication Union (ITU) V.90.

ITU-T Telecommunication Standardization Sector of ITU; "Series V: Data Communication Over the Telephone Network—Simultaneous Transmission of Data and Other Signals;" "Enhancements to Recommendation V.90;" Nov. 2000; International Telecommunication Union (ITU) V.92.

Gieseler, S.; Tunnelbau. Remote-Access-Server als Basis für Virtual Private Networks; Net—Zeitschrift Fuer Kommunikationsmanagement, Huthig Verlag; vol. 52; No. 8/9; 1998; pp. 38-40; XP000782761.

Yu, S. et al.; "A Multimedia Gateway for phone/fax and MIME Mail;" Aug. 25, 1997; Computer Communications; vol. 20; No. 8; pp. 615-627; XP004126715.

\* cited by examiner

REAL TIME FAX OVER PACKET BASED NETWORK

RELATED APPLICATIONS

The present application is a U.S. national filing of PCT Application No. PCT/IL00/00657, filed on Oct. 17, 2000. This application is also related to PCT Application No. PCT/IL00/00492, filed on Aug. 13, 2000, the disclosure of which is incorporated herein by reference.

FIELD OF THE INVENTION

The present invention relates to communication systems and in particular to facsimile transmissions.

BACKGROUND OF THE INVENTION

In some cases it is desired to pass facsimile transmissions over a composite connection including a packet based segment. Procedures for real time transmission of facsimile messages over such composite connections are described in the ITU-T recommendation T.38 (June 1998) "Procedures for real-time Group 3 facsimile communication over IP networks", the disclosure of which is incorporated herein by reference.

Figure 1:
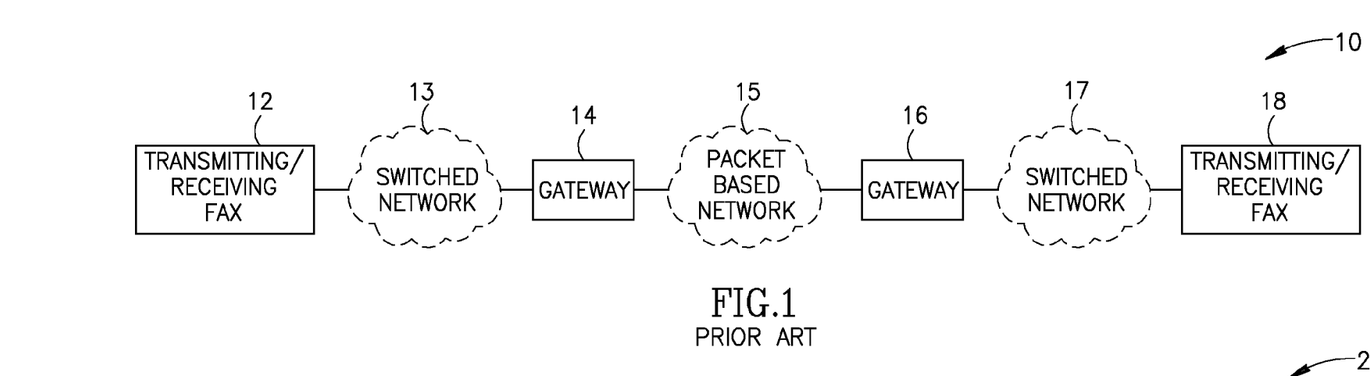
FIG. 1 is a schematic illustration of a composite modem connection, of the prior art.

FIG. 1 shows an exemplary composite connection 10, described in the T.38 recommendation. Connection 10 passes on switched segments 13 and 17 which connect a transmitting fax machine 12 to a first gateway 14 and a second gateway 16 to a receiving fax machine 18, respectively, and a packet based segment 15 which connects gateways 14 and 16. Each of gateways 14 and 16 includes an intermediate modem and an IP interface which transfer signals between the IP network and the PSTN.

The T.38 recommendation describes standard methods for transmitting signals over composite connection 10. Generally, gateways 14 and 16 serve as relay units which pass the bits they receive between the segments of connection 10. However, some specific signals which pass on switched segments 13 and 17 are not passed along packet based segment 15. For example, when a retrain is performed on one of segments 13 or 17 the retrain is handled locally by the respective gateway and the other gateway does not have to be notified of the retrain. The procedures of the T.38 are performed in a manner that the faxes on the ends of the connection (12 and 18) are not aware of the existence of gateways 14 and 16.

The current procedures of the T.38 recommendation, however, are not suitable for use with all facsimile transmission protocols, for example transmissions in accordance with the V.34 half-duplex ITU recommendation. Generally, but not exclusively, this is because of the time constraints that the V.34 half-duplex recommendation places on the negotiation procedure, at the beginning of the facsimile connection. That is, at some specific negotiation stages, the V.34 half duplex recommendation requires that the faxes forming the connection transmit to each other signals (e.g., the MPh signals) which include information on the capabilities of the transmitting faxes. Having each of gateways 14 and 16 generate the signals locally may cause the connections on segments 13 and 17 to have different characteristics which cannot operate together. On the other hand, having gateways 14 and/or 16 wait for information from the other gateway in order to generate the signals, will usually exhaust the time allocated to the transmission of the signals, by the V.34 recommendation.

The V.34 recommendation defines a half duplex protocol for fax transmissions, which operates partially in half duplex and partially in full duplex. Generally, fax data is transmitted in a half duplex mode from a transmitting fax to a receiving fax, while during negotiation and control channel periods signals are transmitted in a full duplex mode.

SUMMARY OF THE INVENTION

An aspect of some embodiments of the present invention relates to a method of establishing a fax connection (e.g., a V.34 half duplex connection) over a composite connection path. During the negotiation stage of the connection, when a gateway must transmit a signal without having the required information to be included in the signal, the gateway transmits the signal with initial (predetermined and/or guess) values. When the required information is received from the other gateway, the gateway determines whether the received information is substantially different than the transmitted initial values. The gateway initiates a control channel retrain (i.e. repetition of a portion of the negotiation stage) if the initial values are substantially different from the received information. Alternatively, a retrain is performed when the required information is received without comparing the received information to the predetermined values. During the retrain, the signal is re-generated using the received information.

Transmitting initial values and then performing a retrain, rather than transmitting the signals later than prescribed by the protocol, keeps the progression of the negotiation under the control of the gateway, and does not cause the progression of the negotiation to depend on behavior which is not regulated by the protocol. Thus, confusion of higher layers of the end-faxes which may begin data transmission before proper negotiation has commenced, substantially does not occur. Performing a controlled retrain by the gateway instead of waiting for a retrain in case an error actually occurs, may cause more retrains than necessary, but reduces the amount of time wasted until the retrains occur. Thus, the overall time of fax transmissions is reduced.

In some embodiments of the invention, the initial values comprise values which are most likely to coincide with the correct values as will be received later on. Optionally, the initial values are chosen as the values used in the most recent connection handled by the gateway. In some embodiments of the invention, the gateways manage a cache memory which store initial values to be used in various connections. Optionally, the initial values are chosen from the cache memory based on the telephone number of the transmitting and/or receiving fax. Alternatively or additionally, the initial values are chosen from the cache memory based on values and/or properties of previously transmitted signals of the current connection.

There is therefore provided in accordance with an embodiment of the invention, a method of establishing a fax connection on a link which is a portion of a composite connection, including transmitting at least some signals of a negotiation procedure on the link, and initiating a retrain on the connection, without identifying a problem on the connection of the link, the retrain being initiated after transmitting the at least some signals of the negotiation procedure but before transmitting data on the data channel of the link due to the negotiation procedure.

Possibly, transmitting the at least some signals of the negotiation procedure includes transmitting signals in accordance with the V.34 half duplex protocol. Optionally, transmitting the at least some signals includes transmitting a PPh signal and/or an MPh signal. In some embodiments of the invention, transmitting the MPh signal includes transmitting the MPh signal with non-final values.

Possibly, initiating the retrain includes initiating the retrain responsive to receiving information relating to a connection on a remote link belonging to the composite connection.

Alternatively or additionally, initiating the retrain includes initiating the retrain responsive to a determination that the transmission rate on a remote link belonging to the composite connection is not compatible with the transmission rate which results from the values transmitted in an MPh signal. Further alternatively or additionally, initiating the retrain includes initiating the retrain responsive to occurrence of a retrain on a remote link belonging to the composite connection. In some embodiments of the invention, initiating the retrain includes initiating the retrain within a period shorter than prescribed by the V.34 as requiring a retrain, from beginning the negotiation procedure.

There is further provided in accordance with an exemplary embodiment of the invention, a method of establishing a fax connection between a pair of faxes, through at least two gateways, including transmitting signals which define a transmission rate on a first link between one of the faxes and a first gateway, receiving, by the first gateway, information relating to the transmission rate on a second link of the connection, determining, based on the received information, whether the transmission rate on the second link is compatible with the transmission rate defined by the signals transmitted on the first link, and initiating a retrain, responsive to the determination, if the transmission rate on the second link was determined not to be compatible with the transmission rate on the first link.

Possibly, transmitting the signals which define a transmission rate on the first link includes transmitting an MPh signal. In some embodiments of the invention, receiving information relating to the transmission rate on the second link of the connection includes receiving information on at least some of the contents of both the MPh signals transmitted on the second link. Optionally, determining whether the transmission rate on the second link is compatible with the transmission rate defined by the signals transmitted on the first link includes determining whether the transmission rates on the first and second links are equal.

Alternatively, determining whether the transmission rate on the second link is compatible with the transmission rate defined by the signals transmitted on the first link includes determining, for one or more channels on the connection, whether the transmission rate on the link closer to the destination of the signals on the channel is not lower than the transmission rate on the link closer to the source. Optionally, initiating a retrain includes is initiating the retrain before transmission of fax data on the connection, after the transmission of the signals which define the signal rate. Possibly, initiating a retrain includes initiating the retrain although no problems were detected on the link on which the retrain was initiated.

In some embodiments of the invention, receiving the information relating to the transmission rate on the second link includes receiving the information after transmitting the signals which define the transmission rate on the first link.

Optionally, the method includes receiving, by the first gateway, partial information relating to the transmission rate on the second link and determining the contents of the transmitted signals which define a transmission rate on the first link based on the partial information. In some embodiments of the invention, the contents of the transmitted signals which define the transmission rate are determined responsive to a telephone number of at least one of the pair of faxes.

There is further provided in accordance with an exemplary embodiment of the invention, a method of establishing a fax connection between a pair of faxes, through at least two gateways, including transmitting, by a first gateway, an MPh negotiation signal which states acceptable transmission rates, during a negotiation stage on a first link connecting the first gateway to one of the faxes, transmitting additional negotiation signals, which do not complete the negotiation stage, on the first link, by the first gateway, receiving, by the first gateway, a start packet indicating that the first link should complete the negotiation stage, from a second gateway, and transmitting an E signal which completes the negotiation stage on the first link, responsive to the received start packet.

Optionally, transmitting the additional negotiation signals includes transmitting additional MPh signals. In some embodiments, transmitting the additional negotiation signals includes transmitting additional MPh signals identical to the first MPh signal.

There is further provided in accordance with an exemplary embodiment of the invention, a gateway for transfer of fax connections on composite connections, including a modem interface for communication with faxes over switched links, a packet interface for communication with a remote gateway over a packet based network, a transmission unit which forwards signals between the modem interface and the packet interface, and a look up table which correlates between values of one or more connection parameters and respective values to be used in at least one negotiation signal transmitted on connections having those values.

Optionally, the one or more connection parameters comprise a telephone number or area code of a fax participating in the connection. Alternatively or additionally, the one or more connection parameters comprise at least a portion of the contents of a negotiation signal transmitted by a gateway participating in the connection. In some embodiments of the invention, the respective values to be used in the at least one negotiation signal are transmitted through the packet interface to a remote gateway which uses the values to generate negotiation signals transmitted on a remote switched link. In some embodiments of the invention; the gateway includes a controller which transmits negotiation signals through the modem interface according to contents of a matching entry of the look up table.

There is further provided in accordance with an exemplary embodiment of the invention, a gateway for transfer of fax connections on composite connections, including a modem interface for communication with faxes over switched links, a packet interface for communication with a remote gateway over a packet based network, and a rate negotiation unit which transmits negotiation signals which limit the transmission rate on at least one of the channels passing through the modem interface to a value below the maximal value allowed by a protocol governing the transmission.

Optionally, the rate negotiation unit limits the rate on at least one control channel. In some embodiments of the invention, the rate negotiation unit limits the rate on the at least one control channel to 1200 bps. Possibly, the rate negotiation unit limits the rate on all the control channels passing through the modem interface.

BRIEF DESCRIPTION OF FIGURES

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 2:
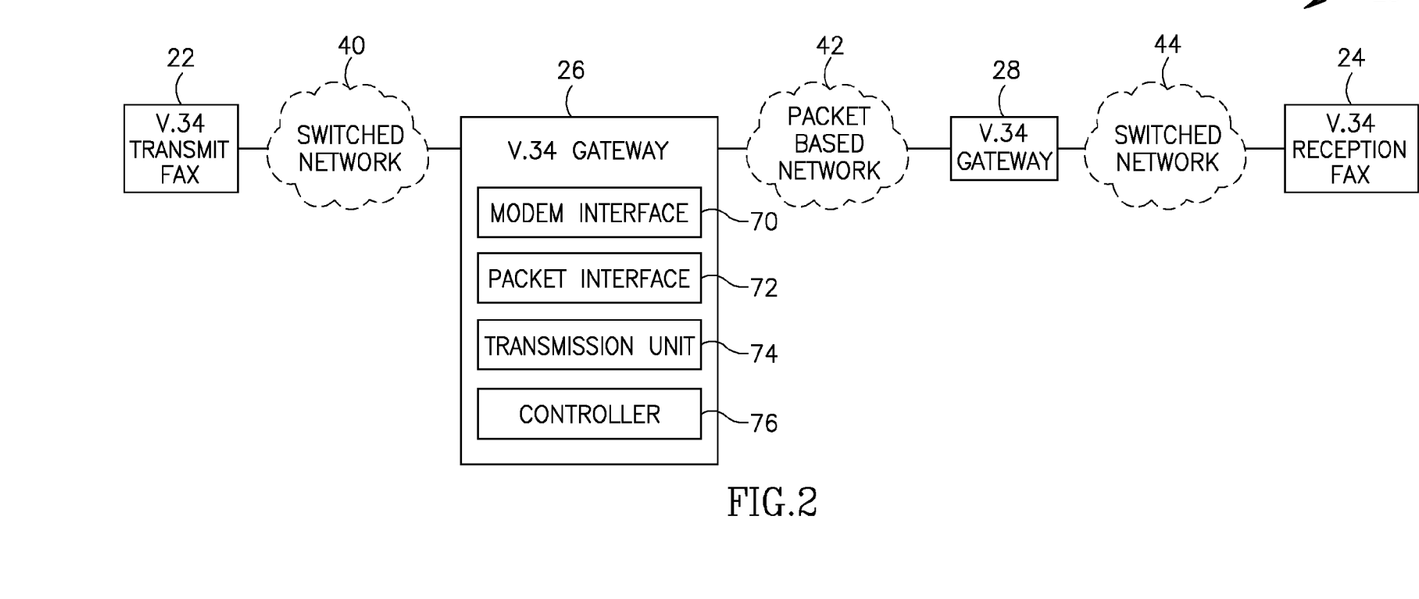
FIG. 2 is a schematic illustration of a composite connection for transmission of V.34 half duplex real time Fax over IP (FoIP) signals, in accordance with an embodiment of the present invention.

FIG. 2 is a schematic illustration of a composite connection 20 for transmission of V.34 half duplex real time Fax over IP (FoIP) signals, in accordance with an exemplary embodiment of the present invention. A transmit (source) V.34 fax machine 22 (which may be a call fax which initiates the fax transmission or an answer fax which responds to a call fax initiative) is to transmit a fax message to a recipient fax machine 24. In order to minimize communication costs in transmitting the fax message, or for any other reason, the connection is established partially over a packet based network 42. Transmit fax machine 22 connects over a link 40 of a public switching telephone network (PSTN) with a V.34 compatible transmit gateway 26 at a local end of packet based network 42. Gateway 26 connects over packet based network 42 to an answer gateway 28 connectable to recipient fax machine 24. Answer gateway 28 connects to recipient fax machine 24, over a link 44 of a PSTN. Unlike gateways 14 and 16 of connection 10 of the prior art, gateways 26 and 28 support transmission of fax messages in accordance with the V.34 ITU recommendation, in accordance with the present invention.

In some embodiments of the invention, gateways 26 and 28 include IP interfaces 70 and modems 72, as described for example, in Israel patent application 136,775, filed Jun. 14, 2000, and in PCT application PCT/IL00/00492, filed Aug. 13, 2000 the disclosures of which are incorporated herein by reference. Gateways 26 and 28 further comprise, in some embodiments of the invention, a controller 76 and a transmission unit 74 adapted to forward negotiation signals of a negotiation procedure between the modem 72 and the IP interface 70. In some embodiments of the invention, transmit fax machine 22 and recipient fax machine 24 are standard modems which are not altered in order to operate in conjunction with gateways 26 and 28, which operate in accordance with the present invention. Furthermore, in some embodiments, transmit fax machine 22 and recipient fax machine 24 do not know whether they are connected directly over a switched line or through gateways 26 and 28.

Figure 3:
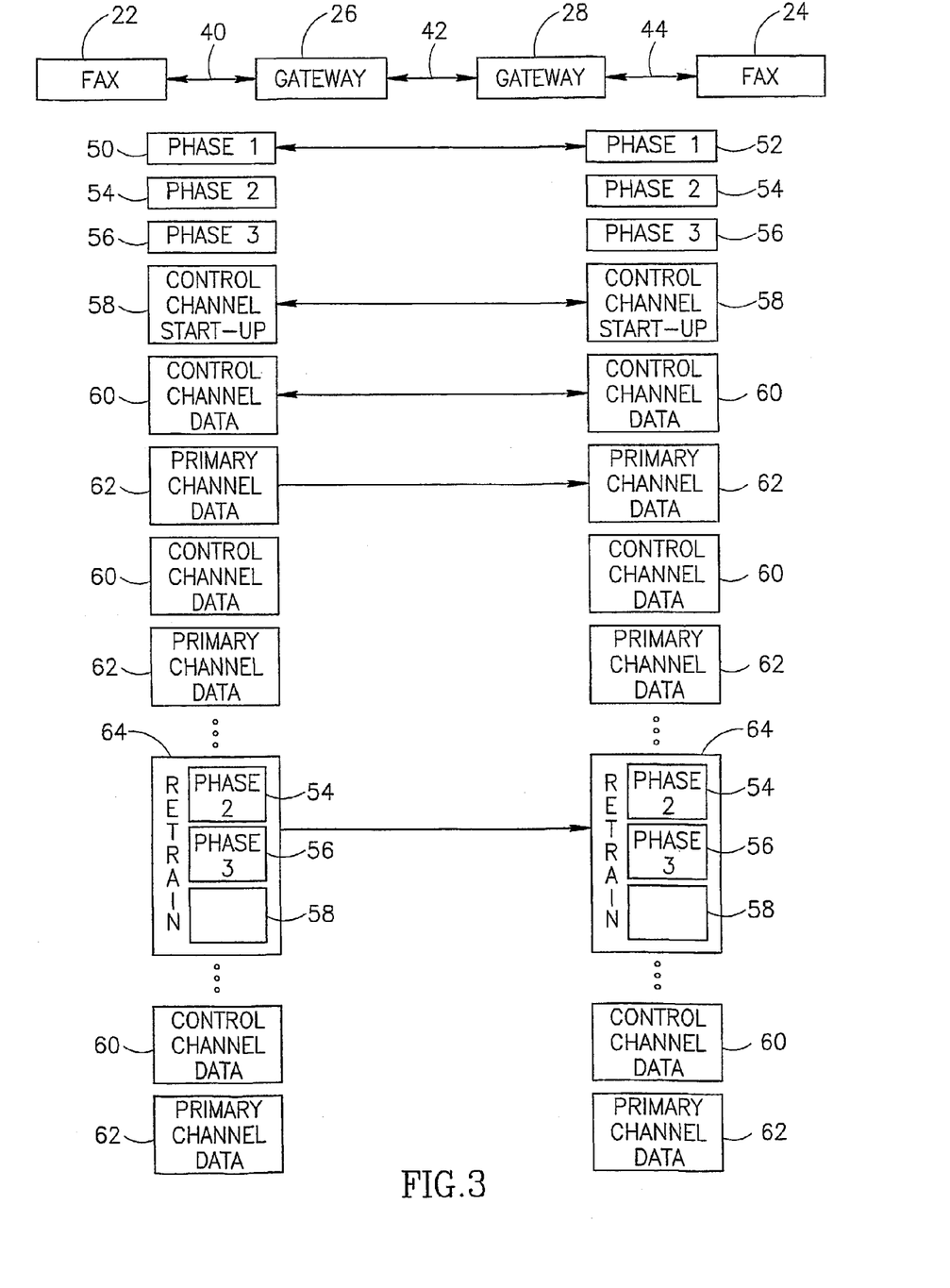
FIG. 3 is a schematic time chart of the signals exchanged during a fax transmission over a composite connection, in accordance with an embodiment of the present invention.

FIG. 3 is a schematic time chart of the signals exchanged over connection 20 during transmission of a fax message, in accordance with an embodiment of the present invention.

Upon establishing connection 20, a phase-1 negotiation procedure 50 is carried out on link 40 between transmit fax 22 and gateway 26. At the beginning of phase-1 negotiation procedure 50, gateway 26 transmits a notification packet to gateway 28 notifying that the phase-1 negotiation procedure has begun. Responsive thereto, gateway 28 and recipient fax 24 perform a phase-1 negotiation procedure 52 on link 44. Optionally, during the progress of phase-1 procedures 50 and 52, information is exchanged between gateways 26 and 28, as described, for example, in the above referenced PCT application PCT/IL00/00492, so that the same protocol, e.g., the protocol defined in the V.34 ITU recommendation, is chosen on both of links 40 and 44.

In some embodiments of the invention, after completing phase-1 procedures 50 and 52, transmit fax 22 and gateway 26, over link 40, and gateway 28 and recipient fax 24, over link 44, perform phase-2 procedures 54 and phase-3 procedures 56. In some embodiments of the invention, phase-2 procedures 54 and phase-3 procedures 56 are performed independently on links 40 and 44 without exchanging information between gateways 26 and 28. Thereafter, control channel start-up procedures 58 are performed on links 40 and 44. Optionally, gateways 26 and 28 exchange information on network 42 during start-up procedures 58 so that the transmission rates selected on links 40 and 44 during start-up procedures 58, are compatible. An exemplary procedure for performing start-up procedures 58 is described hereinbelow with reference to FIG. 4.

After start-up procedures 58, links 40, 42 and 44 carry sequences of control channel data 60 and primary channel data 62. The control channel data and primary channel data are transferred as packets on packet based link 42. The packets include indication of whether the contents of the packets are control data and/or primary data. In some cases, during the transmission of control channel data 60 and/or primary channel data 62, one of transmit fax 22, recipient fax 24, gateway 26 or gateway 28 detects problems on the link 40 and/or 44 to which it is connected, for example data reception problems, and initiates a retrain event 64, a control retrain event (not shown) or a re-synchronization event (not shown) in which the transmission rate on the link 40 or 44 to which the initiating device is connected, is re-negotiated. The gateway 26 or 28 identifying the occurrence of retrain event 64 notifies the other gateway which initiates a similar retrain event on its link. Retrain 64 includes on each of links 40 and 44, a phase-2 procedure 54, a phase-3 procedure 56 and a control channel start-up procedure 58. In some embodiments of the invention, the control channel start-up procedures 58 of the retrain 64 are performed in a manner similar to that described with relation to the initial channel start-up procedures 58, so that the transmission rates on links 40 and 44 after retrain 64, are compatible.

Figure 4:
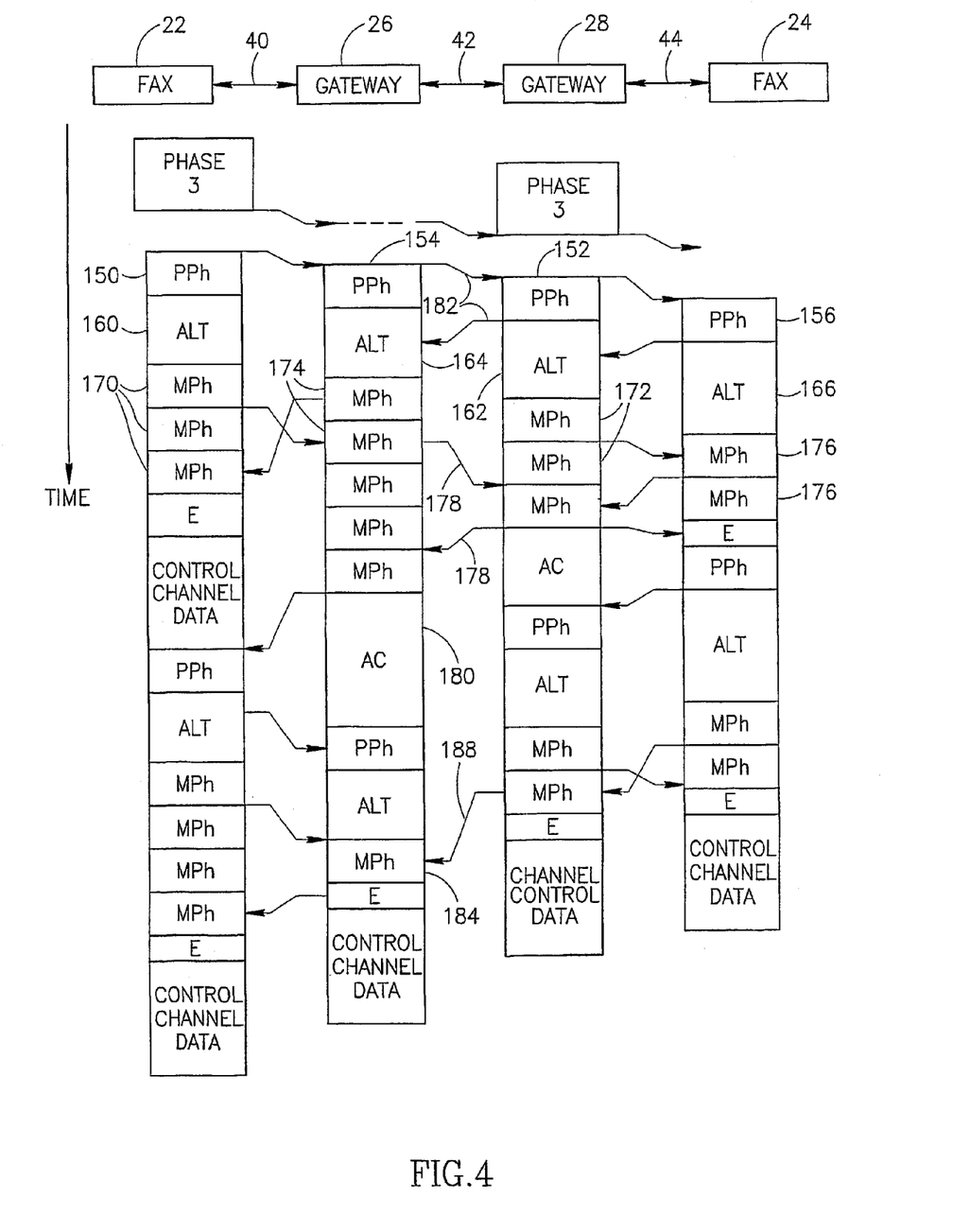
FIG. 4 is a time chart of the signals exchanged during a control channel start-up procedure on a composite connection, in accordance with an exemplary embodiment of the present invention.

FIG. 4 is a time chart of the signals exchanged during a control channel start-up procedure 58 (FIG. 3) on a composite connection, in accordance with an embodiment of the present invention. As defined in the V.34 recommendation, transmit fax machine 22 transmits to gateway 26 over link 40, a PPh signal 150 followed by an ALT signal 160. Similarly, when gateway 28 moves into control channel start-up procedure 58 (FIG. 3) it transmits to recipient fax machine 24, on link 44, a PPh signal 152 followed by an ALT signal 162. Upon receiving PPh signal 150, gateway 26 responds with a PPh signal 154 followed by an ALT signal 164. Similarly, recipient fax 24 responds to PPh signal 152 with a PPh signal 156 followed by an ALT signal 166.

Within a predetermined time from receiving the PPh signals, as defined by the V.34 recommendation, MPh signals 170, 172, 174 and 176 are transmitted by the receiving devices. MPh signals 170 and 176 are transmitted by faxes 22 and 24, respectively, in accordance with the V.34 recommendation. According to the V.34 recommendation, copies of the MPh signals are repeatedly transmitted until an MPh signal from the other end is received.

Figure 5:
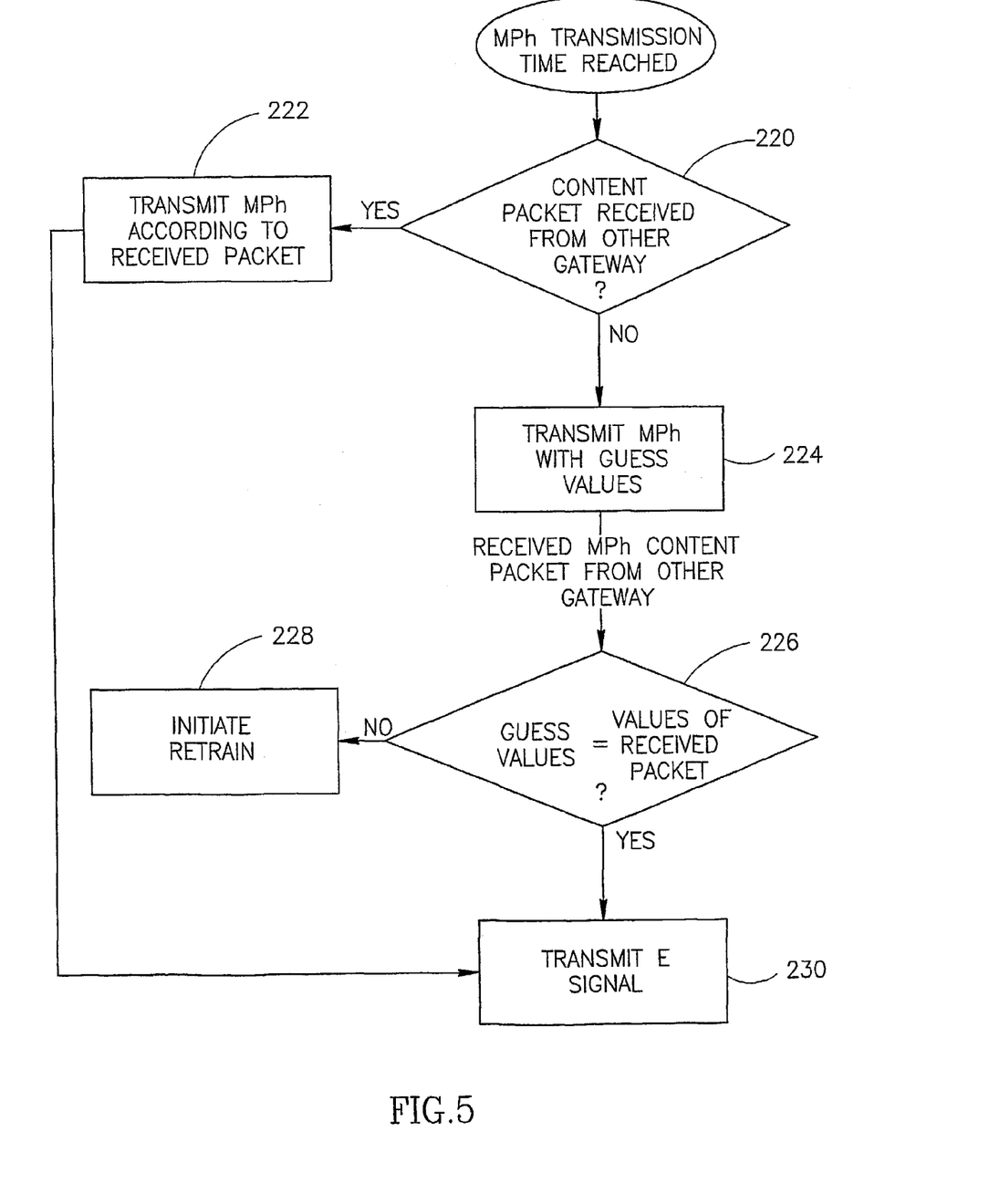
FIG. 5 is a flowchart of the acts performed by a gateway in transmitting MPh signals, in accordance with an embodiment of the present invention.

FIG. 5 is a flowchart of the procedures performed by gateway 26 in transmitting MPh signal 174, in accordance with an embodiment of the present invention. When either of gateways 26 and 28 receives an MPh signal 170 or 176 over its respective link 40 or 44, the contents of the received MPh signal are transmitted in a packet (indicated by arrows 178) over network 42, to the other gateway. Optionally, packet 178 of a gateway (e.g., 28) also includes the contents of the MPh signal (172) transmitted by the gateway. In some embodiments of the invention, packet 178 also includes at least some of the contents of the INFOh signals transmitted on the link to which the transmitting gateway is connected.

If (220) packet 178 from gateway 28 was received by gateway 26 before it transmits its first MPh signal 174, the contents of the received packet 178 are incorporated (222) in the MPh signal 174, as described hereinbelow. Otherwise, the contents of MPh signal 174 are based on (224) initial values, as described hereinbelow. Optionally, gateway 26 continues to transmit copies of its MPh signal 174 until packet 178 from gateway 28 is received.

When the packet 178 from gateway 28 is received, gateway 26 compares (226) the initial values used in generating MPh signal 174 it transmitted to the values in the packet 178 it received. If the compared values are equivalent, gateway 26 proceeds in accordance with the V.34 protocol by transmitting (230) the E signal and moving to transmission and reception of control channel data 60 (FIG. 3). If the compared (226) values are not equivalent, gateway 26 initiates (228) a control retrain on link 40 to which it is directly connected, by transmitting an AC signal 180 (FIG. 4). By performing a retrain, rather than transmitting a later Mph signal with the correct values, gateway 26 assures that transmit fax 22 relates to the correct values transmitted in the later MPh signal and not, as is possible, to the earlier incorrect values.

Responsive to AC signal 180, the control channel start-up procedure 58 on link 40 is repeated, as is shown in FIG. 4. In the repeated procedure, the values used in generating the MPh signal 184 transmitted, are the values received in the content packet 178 during the previous start-up procedure. Optionally, the values from the previous start-up procedure are used as if they are initial values, i.e., upon receiving a further content packet 188 from gateway 28 the values used in MPh signal 184 are compared to the values in the received packet 188 and if they are not equivalent, an additional retrain is performed.

In some embodiments of the invention, in the repeated performance of phase 2 after a retrain, gateway 26 and/or 28 force the connections on links 40 and 44 to agree on a single symbol rate, e.g., the lower of the previously agreed symbol rates on links 40 and 44. Alternatively, gateway 26 and/or 28 force the connections on links 40 and 44 to agree on a symbol rate which allows using a common bit rate. Further alternatively, links 40 and 44 are forced to use symbol rates which allows use of bit rates which can work together. Thus, if a control retrain or a re-synchronization occurs in which the transmission bit rate is changed without performing a full retrain a full retrain will not be required.

In some embodiments of the invention, gateway 28 generates MPh signals in a manner similar to the manner of generating MPh signals by gateway 26 described above. If the initial values are not compatible with the actual values, a retrain is initiated, as described above. Alternatively, gateway 28 generates MPh signals independently without relation to information received from gateway 26. Such independent generation of MPh signals may result in greater transmission rates in one or more of the channels on link 44, relative to what would be determined taking into account properties of the transmission on link 40. If the transmission rate on link 44 ends out to be greater than the rate on link 40 for channels in the direction from transmit fax 22 to recipient fax 24, due to the independent generation of the MPh signal, gateway 28 possibly adds idle bits to the transmitted data bits, for example in a manner similar to that described in the T.38 recommendation. If the transmission rate on link 44 is greater than the rate on link 40 for the control channel in the direction from recipient fax 24 to transmit fax 22, a retrain is optionally initiated in order to make the rates compatible, as described hereinabove. Alternatively, gateway 26 comprises a sufficiently large buffer for storing the control data transmitted from recipient fax 24 to control fax 22 in order to compensate for a possible lower transmission rate on link 40. The use of a buffer is feasible if the amount of data transmitted on the control channel is relatively low. Further alternatively, gateway 28 forces a relatively low transmission rate (e.g., 1,200 bps) on the control channel on link 44 in the direction from recipient fax 24 to transmit fax 22, so as to reduce the chances (or eliminate the possibility) that a retrain will be required. For example, the transmission rate on the control channel on link 44 in the direction from recipient fax 24 to transmit fax 22 may be chosen as slightly lower than, or equal to, the transmission rate on the same control channel on link 40. Alternatively, one of the lowest rates is chosen for the rate on link 44. Further alternatively, the low transmission rate (i.e., 1200 bps) is forced on both the control channels of links 40 and 4 in both directions, so as to eliminate rate mismatch problems.

In some embodiments of the invention, gateways 26 and 28 delay the transmission of their MPh signals 172 and 174 as much as possible within the protocol requirements so as to maximize the chances that the content packet 178 from the other gateway will be received before the transmission of the MPh signal.

If both of gateways 26 and 28 either received content packet 178 before transmitting the MPh signal or used correct initial values, the connections on both of links 40 and 44 move to transmitting control channel data (60) substantially at the same time. If, however, one of gateways 26 or 28 performs a retrain (228) due to initial values not matching the values in the packet 178 received from the other gateway, the time difference between beginning to transmit control channel data 60 on links 40 and 44 may be relatively large. In some embodiments of the invention, when one of gateways 26 or 28 is involved in a retrain during control channel start-up 58, it transmits a packet indicating the retrain to the other gateway. Upon receiving the indication packet, the other gateway initiates a retrain in order to minimize the gap between beginning to transmit control channel data 60 on links 40 and 44, even if there is no other need for such a retrain.

Alternatively, gateways 26 and/or 28 transmit to each other "start" packets, which are used to signal that they are ready to enter the control data channel 60. Gateways 26 and/or 28 continue to transmit MPh signals until they receive the "start" packet from the other gateway, and/or perform a "start" handshake procedure.

In some embodiments of the invention, the MPh signal generated by gateway 26 after the receiving of packet 178 and optionally after the retrain, reflects the parameters of gateway 26 and the parameters of gateways 28 and recipient fax 24 as received in packet 178 from gateway 28. The parameters of recipient fax 24 and gateways 26 and 28 include the information which they include in the MPh signals they transmit. Alternatively or additionally, the parameters include raw data used in generating the MPh signals. In some embodiments of the invention, the generated MPh signal incorporates the common capabilities of gateways 26 and 28 and recipient fax 24 as determined from their parameters. For example, the generated MPh signal includes the highest data rate which is common to the capabilities of gateways 26 and 28 and recipient fax 24. In some embodiments of the invention, gateway 28 generates the MPh signals it transmits after the receiving of packet 178 and optionally after the retrain, in a manner similar to that performed by gateway 26 based on the capabilities of gateways 26 and 28 and transmit fax 22. Thus, the transmission rates and other parameters of the connections on links 40 and 44 will be equal.

Referring in detail to generating the initial values, in some embodiments of the invention, the same initial values are used by a gateway for all connections passing through the gateway. Alternatively, the initial values are chosen as a function of one or more parameters of the current connection. Optionally, the initial values are a function of the telephone number of the remote fax, i.e., the fax to which the gateway is not directly connected (e.g., the number of transmit fax 22 for gateway 28 and the number of recipient fax 24 for gateway 26). Additionally or alternatively, in some embodiments, the initial values are a function of the telephone number of the fax to which the gateway is directly connected. Further alternatively or additionally, the initial values are a function of a portion of the telephone number of transmit fax 22 and/or recipient fax 24, e.g., of the area codes or prefixes, which portion defines links having common physical characteristics. For example, telephone numbers of a certain area may be connected through low quality lines which therefore usually require different initial values than telephone numbers of other areas which are connected through high quality links.

Further alternatively or additionally, the initial values are a function of occurrences occurring earlier on the connection to which the initial values pertain. Optionally, the initial values of a link (e.g., link 44) depend on the information to be included in the MPh signal generated by gateway 28 which is directly connected to the link. Alternatively or additionally, the initial values of the link depend on the test results of phase-2 and/or phase-3 of the connection on the link, as recorded by the gateway directly connected to the link. Further alternatively or additionally, the initial values of the link depend on the timing of the stages during previous stages of the connection on the link, as different apparatus and links have different fine timing characteristics in performing protocol rules.

In some embodiments of the invention, the initial values to be used by a first gateway (e.g., 26) are determined by the other gateway (e.g., 28) and transmitted, in a packet 182, to gateway 26, before gateway 26 needs to transmit its MPh signal. Alternatively or additionally, raw data to be used in determining the initial values, e.g., the contents of MPh and/or INFOh signals, are transmitted (for example, if not transmitted earlier) in packet 182. In some embodiments of the invention, gateway 28 transmits packet 182, to gateway 26, at the beginning of procedure 58, e.g., when it transmits PPh signal 152. Alternatively, the initial values and/or at least some of the raw data to be used in determining the initial values is transmitted between gateways 26 and 28 after completion of phase-2 or during phase-3.

In some embodiments of the invention, gateways 26 and 28 manage a look up table of connection parameters and respective initial values to be used by the gateway, or to be transmitted to a peer gateway for use by it, in generating the MPh signal. In an exemplary embodiment of the invention, gateway 26 manages a list of telephone numbers of transmit faxes 22 and the respective parameters of the connection on link 40 to be used with those telephone numbers. Similarly, gateway 28 manages a list of telephone numbers of recipient faxes 24 and the respective parameters of the connection on link 44 to be used with those telephone numbers. During a connection, before the transmission of the MPh signal, gateways 26 and 28 transmit to each other the parameters to be used for the current connection based on their tables. Thus, each gateway stores the information which relates to the telephone numbers which generally connect to it, e.g. telephone numbers in its vicinity. Alternatively or additionally, gateways 26 and/or 28 list the parameters of the connection on remote links (e.g., link 44 for gateway 26), which are the parameters which the gateway needs in generating the MPh signal it transmits.

In some embodiments of the invention, the initial values used in a current connection comprise the values which were successfully used in the previous connection having the same connection parameters, which was established by the gateway. Alternatively, the initial values comprise the values which are most frequently used by the gateway and/or by gateways in general in connections having the same connection parameters. Optionally, the gateway keeps track of the values of connections which it services and accordingly determines the most frequent values. Alternatively, the gateway is configured with predetermined most frequent (or otherwise desired) values.

In an exemplary embodiment of the invention, when a connection is established, gateways 26 and/or 28 determine the connection parameters of the connection and accordingly generate initial values. If the initial values are not equivalent to the actual values used by the transmit fax 22 or recipient fax 24, i.e., a retrain is required, gateways 26 and/or 28 update the initial values to be used in further connections having the same connection parameters, based on the actual values used after the retrain.

In some embodiments of the invention, the same initial values are used by gateways 26 and/or 28 during the initial control channel start-up procedures 58 and during later control channel start-up procedures occurring due to a re-synchronization and/or a retrain. Alternatively, when a retrain was likely to have occurred due to a reduction in the transmission quality, the initial values used during the retrain include values representing lower transmission rates than initially used for the connection parameters of the current connection. The initial values, of some specific connections, for use upon establishing the connections, indicate, for example, that all transmission rates may be used. Optionally, on these connections, initial values used after a retrain which probably occurred due to a quality reduction of the link carrying the connection, do not indicate the support of a predetermined number of fastest rates. Alternatively or additionally, gateways 26 and 28 manage different tables of guess values for beginning (connection establishment) control channel start-up procedures 58 and for retrain control channel start-up procedures 58.

In some embodiments of the invention, gateways 26 and 28 do not always transmit MPh signals with initial values when information from the peer gateway has not been received. Rather, in some embodiments of the invention, when the initial values do not have a high probability of being correct, the gateway waits for the information from the peer gateway before it transmits its MPh signal. Meanwhile, the gateway transmits incorrect MPh signals or otherwise inoperable signals which will not be interpreted by the fax receiving the signals as an MPh signal. It is noted, however, that some fax machines do not check the correctness of the MPh signals they receive. Therefore, these embodiments are optionally used only when dealing with fax machines which are known to perform correctness checks to the signals they receive.

Referring in more detail to comparing (226, FIG. 5) the initial values to the actual values, in some embodiments of the invention initial values are considered equivalent to the actual values if they result in selecting the same transmission rates. For example, if the initial values and actual values have a common highest transmission rate but differ with regard to lower rates. Alternatively, initial values for a first link (e.g., 44) are considered equivalent to the actual values if they result in selecting transmission rates which can operate properly with the transmission rates of the connection on the other link (e.g., 40).

Referring in more detail to phase-2 procedure 54 and phase-3 procedure 56 (FIG. 3), in some embodiments of the invention, gateways 26 and/or 28 support during phase 2, substantially all the symbol rates of the V.34 recommendation, so as to allow maximal symbol rate leeway to fax machines 22 and 24.

In some embodiments of the invention as described above, the symbol rates used on links 40 and 44 are determined independent of each other during phase-2, such that the symbol rate used by the connection on link 40 may be different than used by the connection on link 44. If gateway 26 determines, in generating the MPh signal for transmission on link 40, that the estimated primary transmission bit rate on link 44 (e.g., 2400 or 2600) cannot be reached with the symbol rate on link 40 (e.g., a symbol rate above 2400), gateway 26 immediately initiates a retrain. Alternatively, gateway 26 waits until it receives MPh signal from transmit fax 22 and then immediately initiates a retrain. Further alternatively, gateway 26 generates the Mph signal based on initial values which fit into the constraints of the symbol rate on link 40, although such values have a lower likelihood to be correct than the other values.

In some embodiments of the invention, if gateway 28 determines, in generating the MPh signal for transmission on link 44, that the estimated transmission bit rate on link 40 (e.g., 2400 or 2600) cannot be reached with the symbol rate on link 44 (e.g., above 2400), gateway 28 performs any of the alternatives described above with relation to gateway 26. Alternatively, gateway 28 allows the transmission bit rate on link 44 to be higher than the transmission bit rate on link 40 as no bottle neck is created due to such discrepancy in rates.

Alternatively or additionally, gateways 26 and/or 28 deliberately do not identify themselves as supporting symbol rates and/or other phase-2 or phase-3 parameters which may not allow the connections on links 40 and/or 44 to reach the same transmission bit rate without changing their symbol rates. In an embodiment of the invention, gateways 26 and/or 28 identify themselves as connecting at the lowest symbol rate, i.e., 2400 symbol/sec. Thus, in case one of links 40 and 44 can only support a bit rate of 2400 or 2600, the other link will be able to establish a connection at the same bit rate.

In some embodiments of the invention, gateways 26 and/or 28 do not generally limit the symbol rates of the connections on networks 40 and 44. However, when a connection does not succeed to reach compatible bit rates on links 40 and 44 due to different symbol rates or other phase-2 or phase-3 parameters, gateways 26 and/or 28 register the connection parameters (e.g., transmit and/or recipient fax telephone number) of the connection. Gateways 26 and/or 28 limit the symbol rates of consequent connections with the registered connection parameters. Alternatively, gateways 26 and/or 28 only register connection parameters of connections in which a single retrain was not sufficient to solve the problem. Optionally, the forcing of the use of the 2400 symbol rate is performed only after a predetermined number of connections which had problems due to symbol rate discrepancies and/or the time extent of the symbol rate forcing is limited in case the network connection to the modem is improved.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features- and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of establishing a fax connection on a link which is a portion of a composite connection, comprising:
    transmitting a signal of a negotiation procedure, including a value of a first parameter, on the link;
    receiving a value included in one or more negotiation signals from a remote link belonging to the composite connection, after transmitting the signal on the link;
    initiating a retrain on the fax connection, after transmitting the signal of the negotiation procedure but before transmitting data on the data channel of the link due to the negotiation procedure; and
    transmitting on the link, after initiating the retrain, a signal of a negotiation procedure with a value of the first parameter selected responsive to the value from the remote link.

2. A method according to claim 1, wherein transmitting the signals of the negotiation procedure comprises transmitting a signals in accordance with the V.34 half duplex protocol.

3. A method according to claim 2, wherein the retrain is initiated after transmitting a PPh signal.

4. A method according to claim 1, wherein the retrain is initiated after transmitting an MPh signal.

5. A method according to claim 4, wherein the retrain is initiated after transmitting the MPh signal with non-final values.

6. A method according to claim 1, wherein initiating the retrain comprises initiating the retrain responsive to receiving the value included in one or more negotiation signals from the remote link belonging to the composite connection.

7. A method according to claim 6, wherein initiating the retrain comprises initiating the retrain responsive to a determination that the transmission rate on a remote link belonging to the composite connection is not compatible with the transmission rate which results from the values transmitted in an MPh signal.

8. A method according to claim 6, wherein initiating the retrain is performed responsive to the received value.

9. A method according to claim 6, wherein initiating the retrain is performed responsive to reception of a signal including the value, without relation to the value itself.

10. A method according to claim 1, wherein initiating the retrain comprises initiating the retrain responsive to occurrence of a retrain on a remote link belonging to the composite connection.

11. A method according to claim 1, wherein initiating the retrain comprises initiating the retrain within a period shorter than prescribed by the V.34 as requiring a retrain, from beginning the negotiation procedure.

12. A method according to claim 1, wherein said link is a link between a pair of faxes, through at least two gateways and wherein said transmitting a signal of a negotiation procedure comprises transmitting signals which define a transmission rate on a first link between one of the faxes and a first gateway.

13. A method according to claim 12, comprising receiving a telephone number of at least one of the pair of faxes and wherein transmitting signals which define a transmission rate on a first link between one of the faxes and a first gateway comprises transmitting signals having content selected responsive to the telephone number of at least one of the pair of faxes.

14. A method according to claim 12, further comprising:
receiving, by the first gateway, information relating to a transmission rate on a second link of the composite connection; and
determining, based on the received information, whether the transmission rate on the second link is compatible with the transmission rate defined by the signals transmitted on the first link.

15. A method according to claim 14, wherein initiating the retrain comprises initiating a retrain, responsive to the determination, if the transmission rate on the second link was determined not to be compatible with the transmission rate on the first link.

16. A method according to claim 15, wherein initiating the retrain comprises initiating the retrain before transmission of fax data on the fax connection, after the transmission of the signals which define the signal rate.

17. A method according to claim 15, wherein initiating a retrain comprises initiating the retrain although no problems were detected on the link on which the retrain was initiated.

18. A method according to claim 14, wherein receiving the value from the remote link comprises receiving information on at least some of the contents of MPh signals transmitted on the second link in both directions.

19. A method according to claim 14, wherein determining whether the transmission rate on the second link is compatible with the transmission rate defined by the signals transmitted on the first link comprises determining whether the transmission rates on the first and second links are equal.

20. A method according to claim 14, wherein the pair of faxes include a source fax and a destination fax and wherein determining whether the transmission rate on the second link is compatible with the transmission rate defined by the signals transmitted on the first link comprises determining, for one or more channels on the composite connection, whether the transmission rate on the link closer to the destination fax is not lower than the transmission rate on the link closer to the source fax.

21. A method according to claim 14, wherein receiving the information relating to the transmission rate on the second link comprises receiving the information after transmitting the signals which define the transmission rate on the first link.

22. A method according to claim 14, comprising receiving, by the first gateway, partial information relating to the transmission rate on the second link and determining the contents of the transmitted signals which define a transmission rate on the first link based on the partial information.

23. A method according to claim 1, wherein said link comprises a link between a pair of faxes, through at least two gateways, and wherein said transmitting at least some signals of a negotiation procedure, comprises:
transmitting, by a first gateway, an MPh negotiation signal which states acceptable transmission rates, during a negotiation stage on a first link connecting the first gateway to one of the faxes;
transmitting additional negotiation signals, which do not complete the negotiation stage, on the first link, by the first gateway;
receiving, by the first gateway, a start packet indicating that the first link should complete the negotiation stage, from a second gateway; and
transmitting an E signal which completes the negotiation stage on the first link, responsive to the received start packet.

24. A method according to claim 23, wherein transmitting the additional negotiation signals comprises transmitting additional MPh signals.

25. A method according to claim 24, wherein transmitting the additional negotiation signals comprises transmitting additional MPh signals identical to the first MPh signal.

26. A method according to claim 1, wherein at least one negotiation signal not transmitted on the link before initiating the retrain is transmitted on the link after initiating the retrain.

27. A method according to claim 1, wherein the first parameter value transmitted after the retrain has a value different from the value of the first parameter transmitted before initiating the retrain.

28. A method according to claim 1, wherein initiating the retrain is performed, without identifying a problem on the fax connection of the link.

29. A gateway for transfer of fax data on composite connections, comprising:
a modem interface for communication with faxes over switched links;

a packet interface for communication with a remote gateway over a packet based network;

a transmission unit adapted to forward negotiation signals received through the packet interface out through the modem interface and negotiation signals received through the modem interface ad out through the packet interface; and a controller adapted to initiate a retrain on a connection handled by the modem interface, after at least some negotiation signals of a negotiation procedure of the connection are forwarded but before data signals are transmitted due to the negotiation procedure, wherein the transmission unit is configured to transmit through the modem interface, after the controller initiates the retrain, a signal of a negotiation procedure with a parameter value selected responsive to a value received from a remote link after a previous occurrence of the signal of the negotiation parameter was transmitted by the transmission unit on the connection.

30. A gateway according to claim 29, further comprising:

a rate negotiation unit which transmits negotiation signals which limit the transmission rate on at least one of the channels passing through the modem interface to a value below the maximal value allowed by a protocol governing the transmission.

31. A gateway according to claim 30, wherein the rate negotiation unit limits the rate on at least one control channel.

32. A gateway according to claim 31, wherein the rate negotiation unit limits the rate on the at least one control channel to 1200 bps.

33. A gateway according to claim 30, wherein the rate negotiation unit limits the rate on all the control channels passing through the modem interface.

34. A gateway according to claim 29, further comprising:

a look up table which correlates between values of one or more connection parameters and respective values to be used in at least one negotiation signal transmitted on connections having those values.

35. A gateway according to claim 34, wherein the one or more connection parameters comprise a telephone number or area code of a fax participating in the connection.

36. A gateway according to claim 34, wherein the one or more connection parameters comprise at least a portion of the contents of a negotiation signal transmitted by a gateway participating in the connection.

37. A gateway according to claim 34, wherein the respective values to be used in the at least one negotiation signal are transmitted through the packet interface to a remote gateway which uses the values to generate negotiation signals transmitted on a remote switched link.

38. A gateway according to claim 34, wherein the controller transmits negotiation signals through the modem interface according to contents of a matching entry of the look up table.

39. A gateway according to claim 29, wherein the controller is configured to initiate the retrain without identifying a problem on the connection.

* * * * *